United States Patent
Foster et al.

(10) Patent No.: US 10,837,630 B2
(45) Date of Patent: Nov. 17, 2020

(54) LIGHTING DEVICE ALIGNMENT CALIBRATION SYSTEM

(71) Applicant: SIGNIFY HOLDING B.V., Eindhoven (NL)

(72) Inventors: Daniel S. Foster, Syracuse, NY (US); Brian M. Wilson, Baldwinsville, NY (US); Christopher D. Nolan, Camillus, NY (US); Joseph R. Casper, Baldwinsville, NY (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/291,735

(22) Filed: Mar. 4, 2019

(65) Prior Publication Data
US 2019/0271455 A1    Sep. 5, 2019

Related U.S. Application Data

(60) Provisional application No. 62/637,634, filed on Mar. 2, 2018.

(51) Int. Cl.
G06K 9/64    (2006.01)
F21V 21/15   (2006.01)
F21V 23/00   (2015.01)
F21V 21/30   (2006.01)
H05B 45/50   (2020.01)
F21W 131/105 (2006.01)

(52) U.S. Cl.
CPC .............. *F21V 21/15* (2013.01); *F21V 21/30* (2013.01); *F21V 23/004* (2013.01); *H05B 45/50* (2020.01); *F21W 2131/105* (2013.01)

(58) Field of Classification Search
USPC ........................................................ 382/291
See application file for complete search history.

(56) References Cited

U.S. PATENT DOCUMENTS

| | | |
|---|---|---|
| 9,888,545 B2 | 2/2018 | Casper et al. |
| 2013/0082606 A1 | 4/2013 | Viner et al. |
| 2014/0161358 A1* | 6/2014 | O'Haire ............. G06K 9/00664 382/199 |
| 2018/0189936 A1* | 7/2018 | Christ ................... G06T 3/4007 |

* cited by examiner

*Primary Examiner* — Stephen P Coleman

(57) ABSTRACT

A system for detecting misalignment of a light fixture uses a gateway controller device to receive images captured by an aerial drone. The gateway controller will select a group of the images and, for each image in the group: identify a segment of an illuminated surface that is contained in the image; identify a light fixture that is configured to direct light to the segment; and determine whether the image contains content indicating that the light fixture improperly aligned. For any image that indicating that the light fixture is improperly aligned, the system will output a signal indicating that the light fixture requires recalibration.

20 Claims, 8 Drawing Sheets

LIGHTING DEVICE ALIGNMENT CALIBRATION SYSTEM

RELATED APPLICATIONS AND CLAIM OF PRIORITY

This patent document claims priority to U.S. Provisional Patent Application No. 62/637,634, filed Mar. 2, 2018. The disclosure of the priority application is fully incorporated into this document by reference.

BACKGROUND

Modern event facilities such as sports stadiums, arenas, concert halls, theaters, amphitheaters, playing fields, convention centers and the like typically use many lighting devices to illuminate a surface such as a playing field, stage, ice rink, court, or exhibition hall. Because most facilities are designed to handle multiple types of events, or even to provide interesting attendee experiences for different types of events, it is often desirable to change the scene—that is, change the characteristics of the light that illuminates the surface—from time to time.

In a system that includes multiple lighting devices directed to a surface, the ability to ensure that each lighting device can be dynamically configured to output light that corresponds to a selected scene is an important feature. However, facility vibrations and wind can cause light fixtures to become physically misaligned. This can cause the light beam to be misdirected and thus degrade the scene quality. Misalignment also may occur when the light fixture is not physically moved, but when individual components such as light emitting diodes (LEDs) within the fixture fail and cause direction or shape of the emitted light beam to change.

Because of this, light fixtures must be calibrated from time to time to direct light to a particular location. However, calibration can be a labor-intensive, and often inaccurate, process. Manual calibration can correct physical misalignment of a light fixture. However, it can be difficult to manually adjust multiple light fixtures that are typically mounted high above the facility, and it is not practical to manually adjust lights during the course of an event. In addition, manual calibration cannot sufficiently account for all situations, such as failure of individual LEDs.

This document describes improved systems and methods for calibrating light fixtures such as those described above.

SUMMARY

Various embodiments of system for detecting misalignment of a light fixture in a set of light fixtures that direct light to a surface are disclosed. In some embodiments, the system includes a gateway controller device. In some embodiments, the system also may include, or it may receive data collected by, an imaging device or an aerial drone that is equipped with an imaging device. A computer-readable memory device contains programming instructions that are configured to cause the gateway controller device to receive, such as via a communication interface from the aerial drone or the imaging device, images captured by the imaging device at one or more locations over an illuminated surface. The gateway controller device will select a group of the images and, for each image in the group: (i) identify a segment of the illuminated surface that is contained in the image; (ii) identify a light fixture that is configured to direct light to the segment; and (iii) determine whether the image contains content indicating that the light fixture that is configured to direct light to the segment is improperly aligned. For any image that contains content indicating that the light fixture that is configured to direct light to the segment contained in the image is improperly aligned, the gateway controller device will output a signal indicating that that light fixture requires recalibration.

Optionally when determining, for each image in the group, whether the image contains content indicating that the light fixture that is configured to direct light to the segment is improperly aligned, the system may measure luminance of each pixel in a group of pixels in the image, detect a position of maximum luminance in the segment, access a data set of calibration data, and identify from the data set an expected location of maximum luminance for the segment. The system also may determine whether the detected position of maximum luminance is within a tolerance range of the expected location. If the detected position of maximum luminance is within the tolerance range of the expected location, the system may determine that the light fixture is properly aligned, otherwise the system will determine that the light fixture is improperly aligned.

Optionally, when determining, for each image in the group, whether the image contains content indicating that the light fixture that is configured to direct light to the segment is improperly aligned, the system may measure luminance of each pixel in a group of pixels in the image, detect an area of maximum luminance in the segment, identify a size of the area of maximum luminance, access a data set of calibration data and identify from the data set an expected size for the area of maximum luminance for the segment. The system may then determine whether the detected size of the area of maximum luminance matches the expected size. If the detected size matches the expected size, the system may determine that the light fixture is properly aligned, otherwise the system will determine that the light fixture is improperly aligned.

Optionally, when determining, for each image in the group, whether the image contains content indicating that the light fixture that is configured to direct light to the segment is improperly aligned, the system may measure luminance of each pixel in a group of pixels in the image, detect an area of maximum luminance in the segment, identify a shape of the area of maximum luminance, access a data set of calibration data and identify from the data set an expected shape for the area of maximum luminance for the segment. The system may then determine whether the detected shape of the area of maximum luminance matches the expected shape. If the detected shape matches the expected shape, the system may determine that the light fixture is properly aligned, otherwise the system may determine that the light fixture is improperly aligned.

Optionally, the system may include a drone controller and programming instructions configured to cause the drone controller cause the aerial drone to capture the images by causing the aerial drone to move within an imaging range of each of a plurality of reference points in the facility. For each of the reference points, the drone will capture an image of an area of the illuminated surface that includes the reference point.

Optionally, the gateway controller device may, for each image in the group: (i) identify a beam shape of emitted light directed to the segment by detecting a shape of a group of adjacent pixels in the image for which the measured luminance is at least a threshold percentage of the maximum luminance; and (ii) use the identified beam shape when identifying the segment of the surface that is contained in the image by selecting, from a data set, a segment of the surface having an expected beam shape that corresponds to the identified beam shape.

Optionally, the system also may include the light fixture, which is associated with a fixture controller. The system also may include additional programming instructions that are configured to cause the gateway controller device to, upon determining that the light fixture is not properly aligned, send a command to the fixture controller of the light fixture to adjust a shape or direction of light emitted by the light fixture.

Optionally, the system may include the light fixture, a motor, and a motor controller configured to move the light fixture. The system also may include additional programming instructions that are configured to cause the gateway controller device to, upon determining that the light fixture is not properly aligned, send a command to the motor controller of the light fixture to adjust roll, pitch and/or yaw of the light fixture.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. In this document, when terms such "first" and "second" are used to modify a noun, such use is simply intended to distinguish one item from another, and is not intended to require a sequential order unless specifically stated. As used in this document, the term "comprising" (or "comprises") means "including (or includes), but not limited to."

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

In this document, the term "aerial drone" refers to an unmanned vehicle that uses aerodynamic forces to provide vehicle lift, and that can fly autonomously or be piloted remotely. An aerial drone may also be referred to by those of skill in the art as an unmanned aerial vehicle (UAV), unmanned aircraft system (UAS), a remotely-piloted aircraft (RPA), or simply a drone. When this document refers to a drone as "camera-enabled" it refers to a drone that is equipped with an imaging device.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

A "communication interface" of a lighting device or other electronic device is a hardware element configured to enable the device to transmit and/or receive data signals from proximate devices and/or a communication network. Communication interfaces for communicating with proximate devices may include, for example, a short range wireless communication interface such as a transmitter, a near field communication (NFC) or radio frequency identifier (RFID) tag, or a Bluetooth™ or Bluetooth™ Low Energy (BLE) transceiver. Communication interfaces for indirectly communicating with proximate or non-proximate devices via one or more communication networks may include, for example, a wireless network card with wireless network antenna, a data port, or the like.

In this document, the terms "controller" and "controller device" mean an electronic device or system of devices containing a processor and configured to command or otherwise manage the operation of one or more other devices. For example, a "fixture controller" is intended to refer to a controller configured to manage the operation of one or more light fixtures to which the fixture controller is communicatively linked. A "gateway controller" refers to a central server or other controller device that is programmed to generate commands, or is in communication with a server or other electronic device from which it receives commands from a remote electronic device, and the gateway controller routes the commands to appropriate lighting device fixture controllers in a network of lighting devices. This document may use the term "lighting device controller" to refer to a component when the component may be either a gateway controller or a fixture controller. A controller will typically include a processing device, and it will also include or have access to a memory device that contains programming instructions configured to cause the controller's processor to manage operation of the connected device or devices.

The terms "electronic device" and "computing device" refer to a device having a processor, a memory device, and a communication interface for communicating with proximate and/or local devices. The memory will contain or receive programming instructions that, when executed by the processor, will cause the electronic device to perform one or more operations according to the programming instructions. Examples of electronic devices include personal computers, servers, mainframes, virtual machines, containers, gaming systems, televisions, and portable electronic devices such as smartphones, wearable virtual reality devices, Internet-connected wearables such as smart watches and smart eyewear, personal digital assistants, tablet computers, laptop computers, media players and the like. Electronic devices also may include appliances and other devices that can communicate in an Internet-of-things arrangement, such as smart thermostats, home controller devices, voice-activated digital home assistants, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered to be an electronic device. In the discussion below, a client device, server device, virtual machine or container may be referred to simply as a "device" for brevity. Additional elements that may be included in electronic devices will be discussed below in the context of FIG. 8.

In this document, the term "imaging device" refers generally to a hardware sensor that is configured to acquire digital images. An imaging device may capture still and/or video images, and optionally may be used for other imagery-related applications. For example, an imaging device can be held by a user such as a DSLR (digital single lens reflex) camera, cell phone camera, or video camera. The imaging device may be part of an image capturing system that includes other hardware components. For example, an imaging device can be mounted on an accessory such as a monopod or tripod. The imaging device can also be mounted on a transporting vehicle such as an aerial drone, a robotic vehicle, or on a piloted aircraft such as a plane or helicopter having a transceiver that can send captured digital images to, and receive commands from, other components of the system.

In this document, the terms "lighting device," "light fixture," "luminaire" and "illumination device" are used interchangeably to refer to a device that includes a source of optical radiation. Sources of optical radiation may include, for example, light emitting diodes (LEDs), light bulbs, ultraviolet light or infrared sources, or other sources of optical radiation. In the embodiments disclosed in this document, the optical radiation emitted by the lighting devices includes visible light. A lighting device will also include a housing, one or more electrical components for conveying power from a power supply to the device's optical radiation source, and optionally control circuitry.

In this document, the terms "memory" and "memory device" each refer to a non-transitory device on which computer-readable data, programming instructions or both are stored. Except where specifically stated otherwise, the terms "memory" and "memory device" are intended to include single-device embodiments, embodiments in which multiple memory devices together or collectively store a set of data or instructions, as well as one or more individual sectors within such devices.

In this document, the terms "processor" and "processing device" refer to a hardware component of an electronic device (such as a controller) that is configured to execute programming instructions. Except where specifically stated otherwise, the singular term "processor" or "processing device" is intended to include both single processing device embodiments and embodiments in which multiple processing devices together or collectively perform a process.

Figure 1:
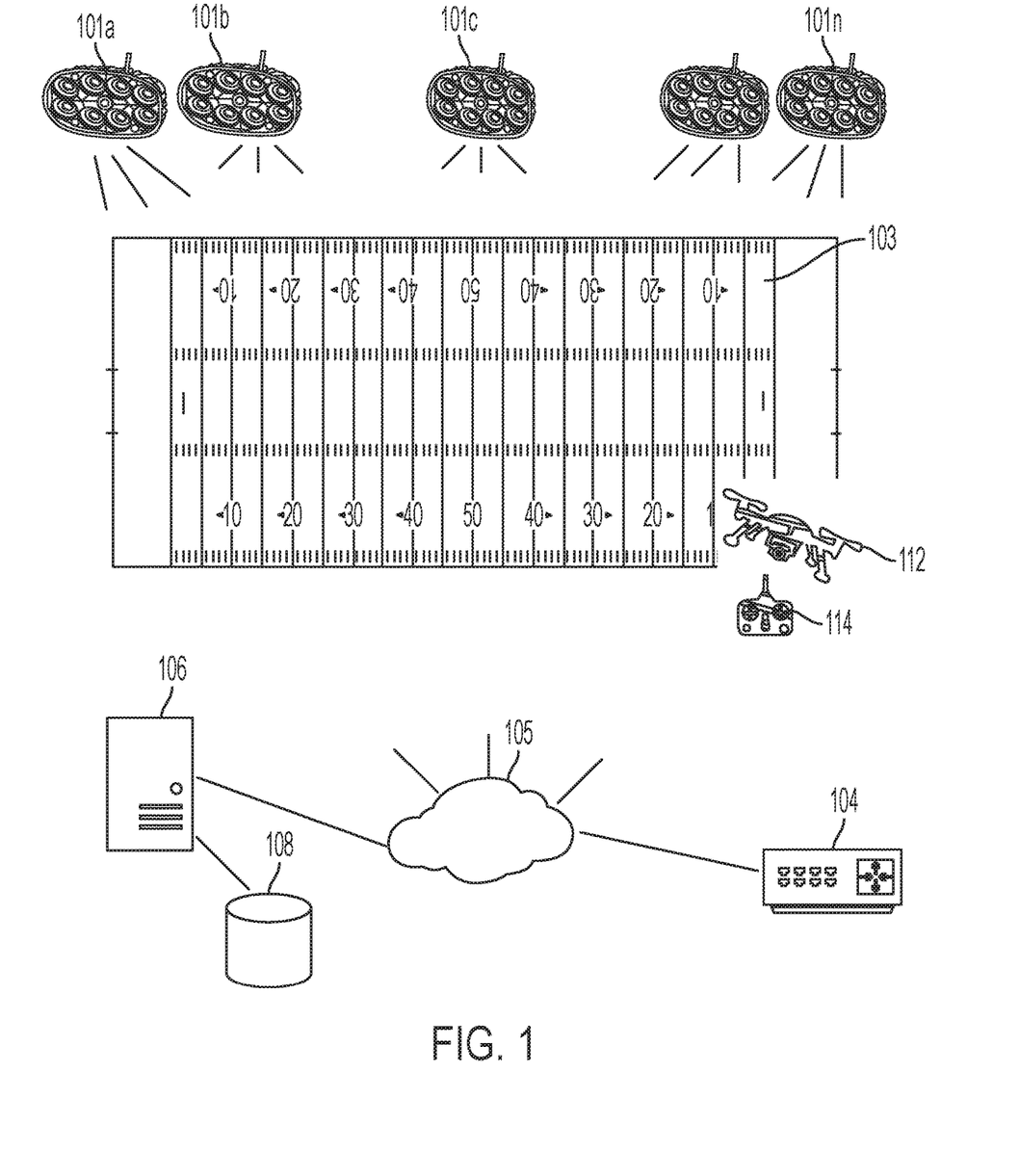
FIG. 1 illustrates an example of a network of lighting devices positioned around a surface to be illuminated, such as a playing field in a stadium or other sports facility.

FIG. 1 illustrates an environment in which any number of lighting devices 101a . . . 101n are positioned at various locations in an environment to illuminate a surface 103. In this case the surface 103 is the playing field of a football, soccer or lacrosse facility. Other illuminated surfaces may include basketball courts, hockey rinks, performance stages, or other surfaces toward which light is directed from multiple sources. If the surface 103 is part of a structure such as a stadium, arena, concert hall, amphitheater, park or other sports or entertainment facility, or a commercial building or other light-enabled facility, then the lighting devices 101a . . . 101n may be attached to various locations of the structure. In addition or alternatively, some or all of the lighting devices 101a . . . 101n may be supported by an independent support structure such as a mast or pole.

Optionally, some or all of the group of lighting devices at the facility may be controlled by a gateway controller 104 communicatively coupled to one or more fixture controllers that are connected to or integral with the lighting devices 101a . . . 101n. Each fixture controller and the gateway controller 104 may be capable of communicating with each other a communication network 105, such as a cellular communication work, an Internet, a mesh network or other wired or wireless communication networks. A server 106 also may be communicatively connected to the communication network 105 so that it can communicate with the gateway controller 104, and/or fixture controllers. The server 106 may include or be connected to one or more memory devices that collectively store a database 108 of data for the light-enabled facility, data about available lighting devices and optional functions, available scenes, and other data.

The system also may include a camera-enabled aerial drone 112 and a remote controller device 114. The remote controller device may be an electronic device that is programmed to guide the aerial drone 112 to various locations over the surface 103 to use an imaging device to capture images of the surface at various designated locations. Alternatively, the remote controller device may be an electronic device that is in communication with another electronic device (such as the server or gateway controller mentioned above) that contains programming to implement commands that are sent to the drone by the controller device. Optionally, the remote controller device 114 may be integral with the other devices. This image capture process will be described in more detail below.

Figure 2:
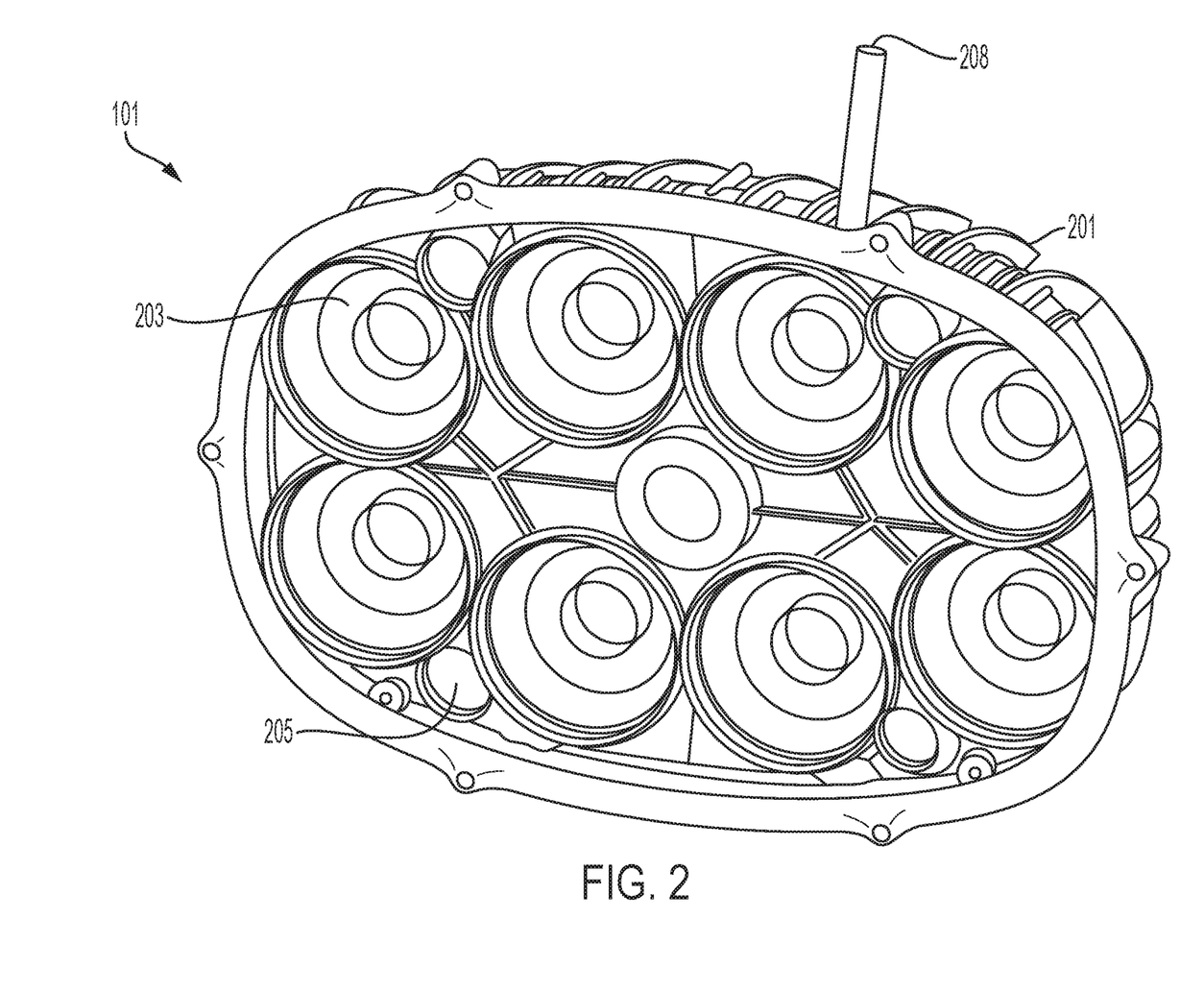
FIG. 2 illustrates an example of a lighting device that may be used with a network of lighting devices.

Referring to FIG. 2, an example lighting device 101 will include an optical radiation source, such as any number of lighting modules that include LEDs, and in various embodiments a number of LED modules sufficient to provide a high intensity LED device. In some embodiments, a lighting device may include multiple types of LED modules. For example, a lighting device may include a first type of LED module 203 having LEDs that are configured to selectably emit white light of various color temperatures, along with a second type of LED module 205 having LEDs that are configured to selectably emit light of various colors. The lighting device 101 may include a housing 201 that holds electrical components such as a fixture controller, a power source, and wiring and circuitry to supply power and/or control signals to the LED modules.

Figure 3:
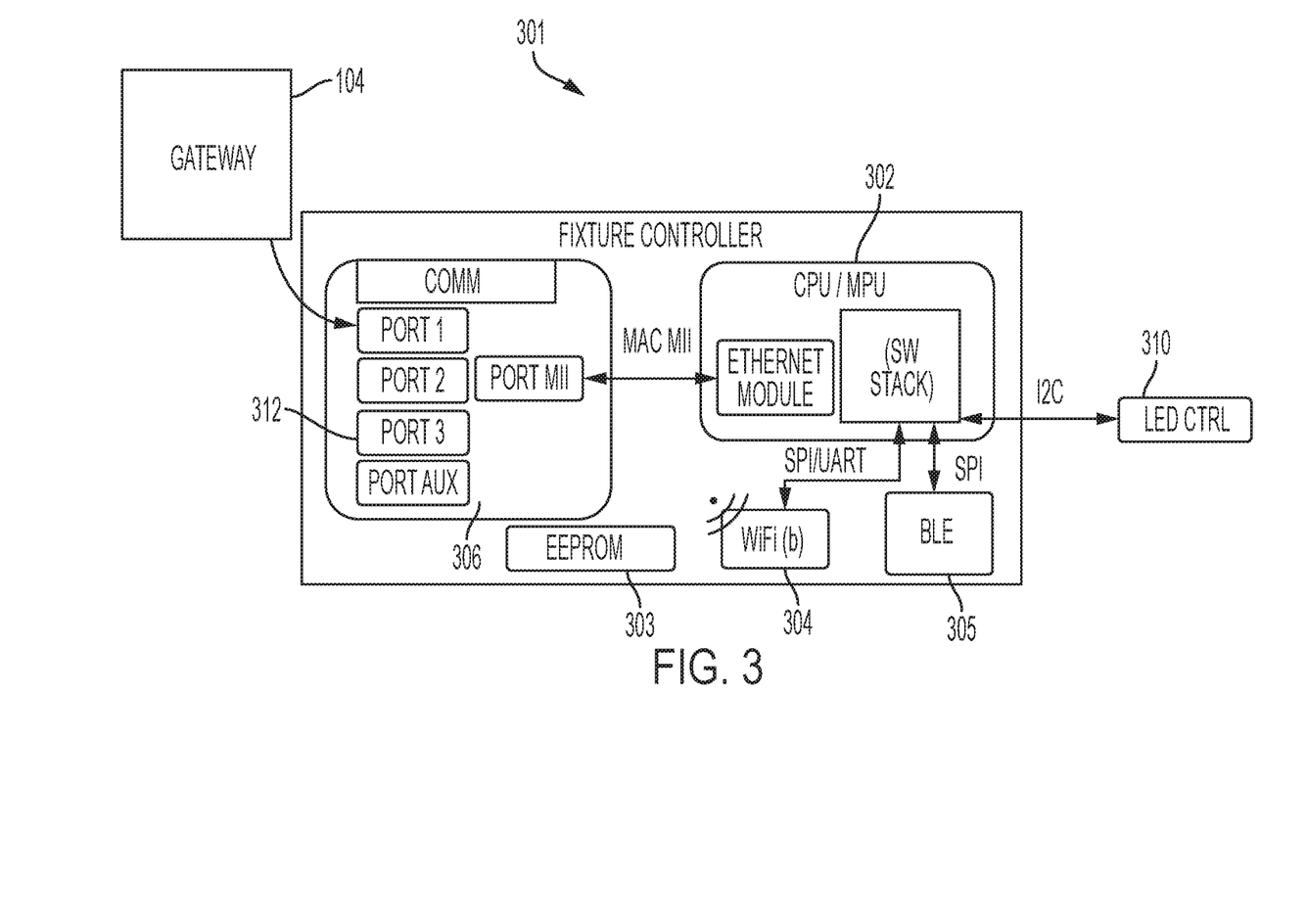
FIG. 3 illustrates example components of a fixture controller of a lighting device.

A fixture controller may be an external device or an integral device that includes various components of an illumination device's control circuitry. Example components of a fixture controller 301 are shown in FIG. 3. A fixture controller 301 will include a processor 302 and memory device 303 containing programming and/or data that the processor 302 uses to selectively control the LED modules 310 or other optical radiation source of the lighting device.

The fixture controller 301 will include any number of communication interfaces, such as a Wi-Fi antenna 304, a short-range communication or NFC transceiver 305, and/or a wired communication interface 306 containing any number of ports 312 via which other lighting devices, controllers or other devices may be connected to the fixture controller's lighting device. For example, a gateway controller 104 may be connected to the fixture controller 301 via any of the ports 312. The gateway controller may include a processor and a communications interface that includes a router or switch with one or more Ethernet ports or optical fiber connectors configured to receive an Ethernet and/or fiber-optic cable. Other types of cables and connectors may be used, but for purposes of this disclosure, Ethernet and fiber-optic cables and connectors will be used as examples.

Figure 4:
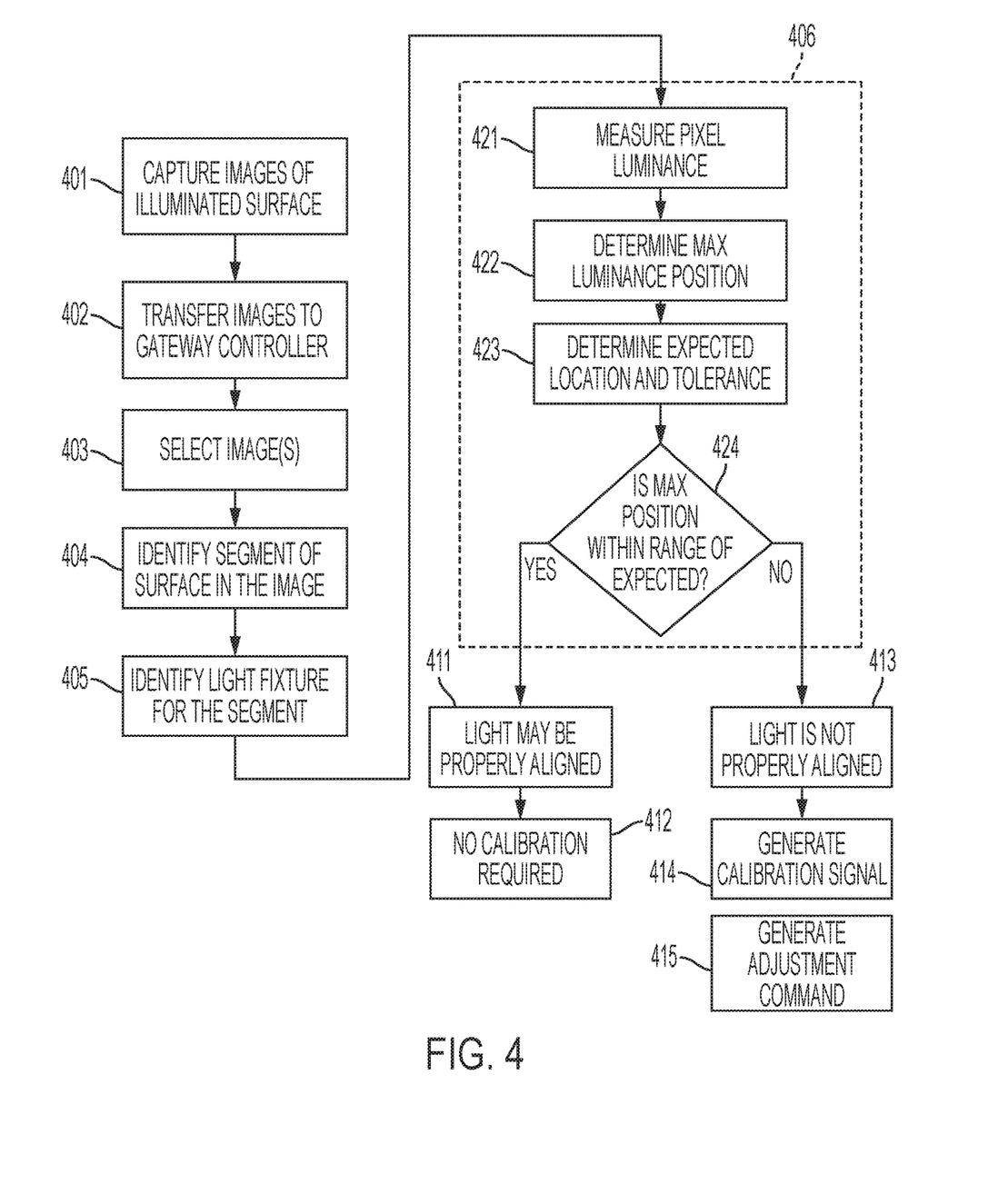
FIG. 4 illustrates a process for detecting lighting device misalignment.

FIG. 4 is a flow diagram illustrating a process of calibrating one or more lighting devices that emit light toward a surface. The system will include an imaging device that captures images (step 401) at various locations over the surface as the surface is illuminated by the lighting devices. The imaging device may be attached to or part of an aerial drone. Alternatively, the imaging device may be attached to or part of a camera that is mounted in the facility to a post, guide rail, guide wire (such as in a Skycam or other cable-suspended camera system), carried by a piloted vehicle, or manually carried around the facility. The imaging device and/or its carrier (such as an aerial drone) will include a communication interface such as a transmitter (e.g., a near-field or short-range communications transceiver, Wi-Fi card, or USB port) via which digital image files captured by the imaging device may be transferred to a gateway controller device and/or other electronic device such as a remote server that is communicatively connected to the gateway controller device (step 402).

Figure 5A:
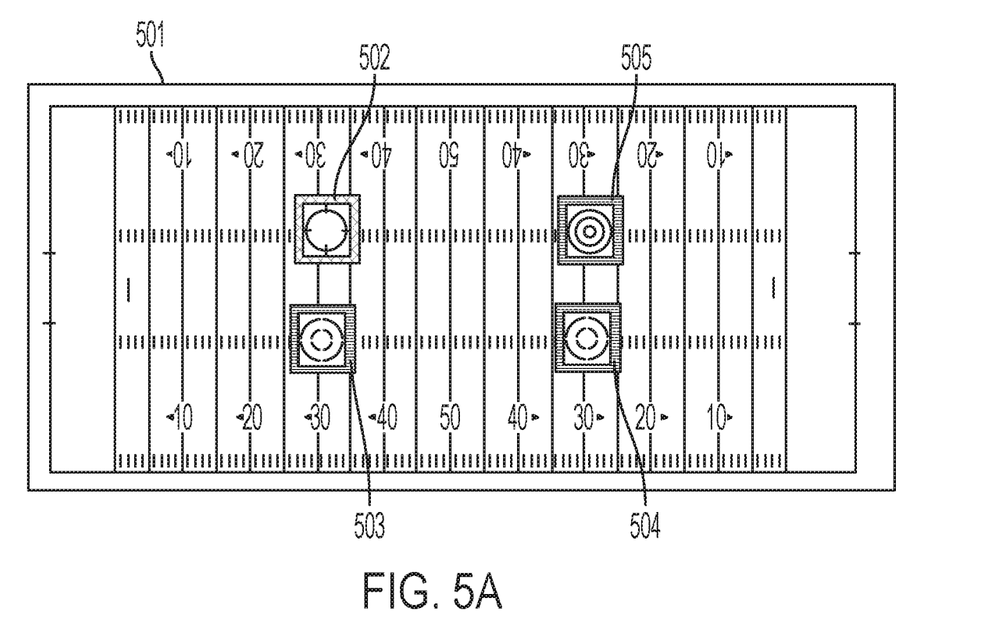
FIGS. 5A and 5B illustrate examples of illuminated surfaces with reference points placed in various locations.
Figure 5B:
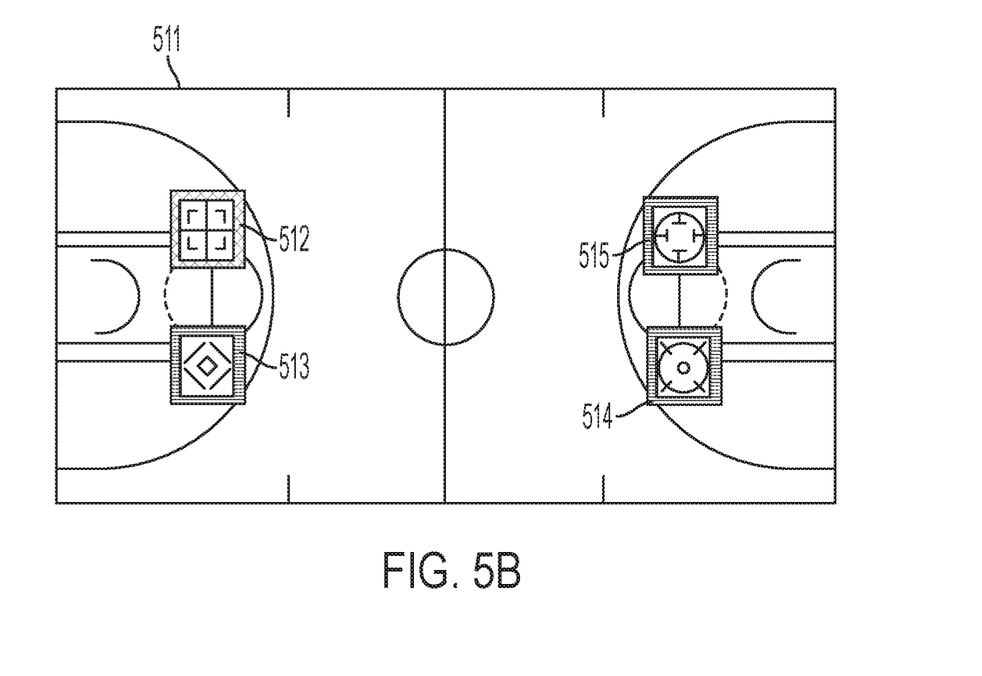

In embodiments where the imaging device is connected to an aerial drone, an operator may use a drone controller, or an automated drone controller may be provided for controlling movement of the aerial drone. (A drone controller is also illustrated in FIG. 1 as a remote controller device 114.) The drone controller will be programmed to cause the imaging device to capture images of a various segments of the illuminated surface by causing the aerial drone to move within an imaging range of each of various reference points in the facility. FIGS. 5A and 5B illustrate examples of surfaces 501, 511. Surface 501 is a football field with reference points 502-505 positioned at designated locations. Surface 511 is a basketball court with reference points 512-515 positioned at designated locations. The reference points may be designated by placing targets on the surface as shown, and the drone may move about the facility to capture images of areas that include the targets. Alternatively, the reference points may correspond to features that already exist on the surface, such as numbers, hash marks, boundary lines and the like.

The programming instructions may be configured to cause the imaging device to analyze content of images received and capture still images when a reference point is detected in an image. Alternatively, the camera may capture video as the drone (or other carrier) moves the camera about the facility, the captured video frames may be analyzed to detect those containing a reference point, and image frames containing a reference point may be extracted from the video stream for use in the lighting device alignment analysis. If multiple candidate frames include a particular reference point, the programming instructions may include a rule to select the candidate frame in which the reference point is closest to a designated location within the frame, such as closest to a center point of the frame. In any of these methods, for each of the reference points, the imaging device will capture an image of an area of the surface that includes the reference point.

The gateway controller or a communicatively connected device such as a remote server will select (step 403) a group of the images (which may be all images received, or a subset of those received). For each image in the group, the gateway controller will: (i) identify a segment of the illuminated surface that is contained in the image (step 404); (ii) identify a light fixture that is configured to direct light to the segment (step 405); and (iii) determine whether the image contains content indicating that the light fixture that is configured to direct light to the segment is not properly aligned (step 406).

To identify a segment of the illuminated surface that is contained in the image (step 404), the system may access a data set that includes reference point data and associated segment data to determine which segment is associated with the reference point that is detected in the image. Alternatively or in addition, the system may identify a segment by recognizing a beam shape of emitted light directed to the segment and determining whether the shape matches an expected shape that is associated with a segment in the database. The system may identify the beam shape to be a shape of a group of adjacent pixels in the image for which the measured luminance is at least a threshold percentage of the maximum luminance. (An example of this will be shown in the discussion of FIGS. 7A and 7B below.) The system may use the identified beam shape when identifying the segment of the surface that is contained in the image by selecting, from a data set, a segment of the surface having an expected beam shape that corresponds to the identified beam shape. The system may require that a segment have both a reference point and expected beam shape, or it may use one or the other of these features to identify a segment. In addition, the system may only require one of these features to identify a segment, but it may use or require the other feature (or additional features) to improve its confidence in its identification of a particular segment, to choose an image from multiple candidate images for a segment, or to confirm the identification of a segment if the first feature is not detected with at least a threshold degree of confidence.

To identify a light fixture that is configured to direct light to the segment (step 405), the system may access the same data set, or it may access a different data set that associates segments with light fixtures to identify the light fixture that is associated with the segment that contains the data point.

To determine whether the image contains content indicating that the light fixture that is configured to direct light to the segment is not properly aligned (step 406), the system may measure luminance of each pixel in a group of pixels in the image (step 421). The measurement of luminance may be obtained from the image file itself, if a luminance value is associated with each pixel. Alternatively, luminance may be measured using an image processing algorithm such as luminance=(R*0.3)+(G*0.59)+(B*0.11), where R, G and B are the respective red (R), green (G) and blue (B) values of the pixel. Other methods may be used, such as by collecting luminance data using a monochromatic camera, or using an offset correction (e.g., imaging without any lights on, and then turning lights on), color correction (e.g., we can tell that the surface is blue or green, so apply a correction factor based on what spectra the light is emitting and the sensitivity of the sensor to such) to determine a relative luminance.

The system will then detect a position of maximum luminance in the segment (step 422), which may be the location of the surface that is associated with a position of the pixel or group of adjacent pixels having the highest measured luminance value of the image. The system will access a data set of calibration data and identify, from the data set, an expected location of maximum luminance for the segment. The system will also identify an acceptable tolerance range (step 423), which will be a percentage or numeric value or algorithm indicating an amount by which the detected position of maximum luminance may deviate from the expected location of maximum luminance. The acceptable tolerance range may be part of the gateway controller's programming instructions, or the system may retrieve the acceptable tolerance range from a database that stores it in association with an identifier for the segment.

The system will then calculate the distance between the detected and expected locations of maximum luminance, and it will determine whether the detected position of maximum luminance matches (i.e., is within the tolerance range of) the expected location (step 424). The distance may be a distance in the image (i.e., as measured in numbers of pixels) or it may be a calculated distance on the illuminated surface, or it may be some other measurement. If the detected position of maximum luminance is within the tolerance range of the expected location, the system may determine that the light fixture is properly aligned (step 411). Otherwise, it may determine that the light fixture is not properly aligned (step 413). The system also may determine the size of the area.

Because the position of maximum luminance will not always be associated with a single pixel, when determining the position of maximum luminance (step 422) the system may actually do so for an area rather than a single pixel. The position may then be the central point of the detected area. Optionally, the system may determine a size of the area of maximum luminance. For example, referring to FIG. 6, a segment 601 of a basketball court includes a reference point 602 and a group of pixels 603 around the reference point that all share, or which are within a specified deviation from (such as at least 50% of) the maximum detected luminance. The system may measure the size of this area (in number of pixels or otherwise). If the size of this area does not match an expected size (with "match" not necessarily meaning an exact match, but allowing for some insignificant levels of difference), the system may determine that the beam spread generated by the lighting device is smaller or larger than is specified for the scene, and it may therefore determine that the light fixture is misaligned.

Figure 6:
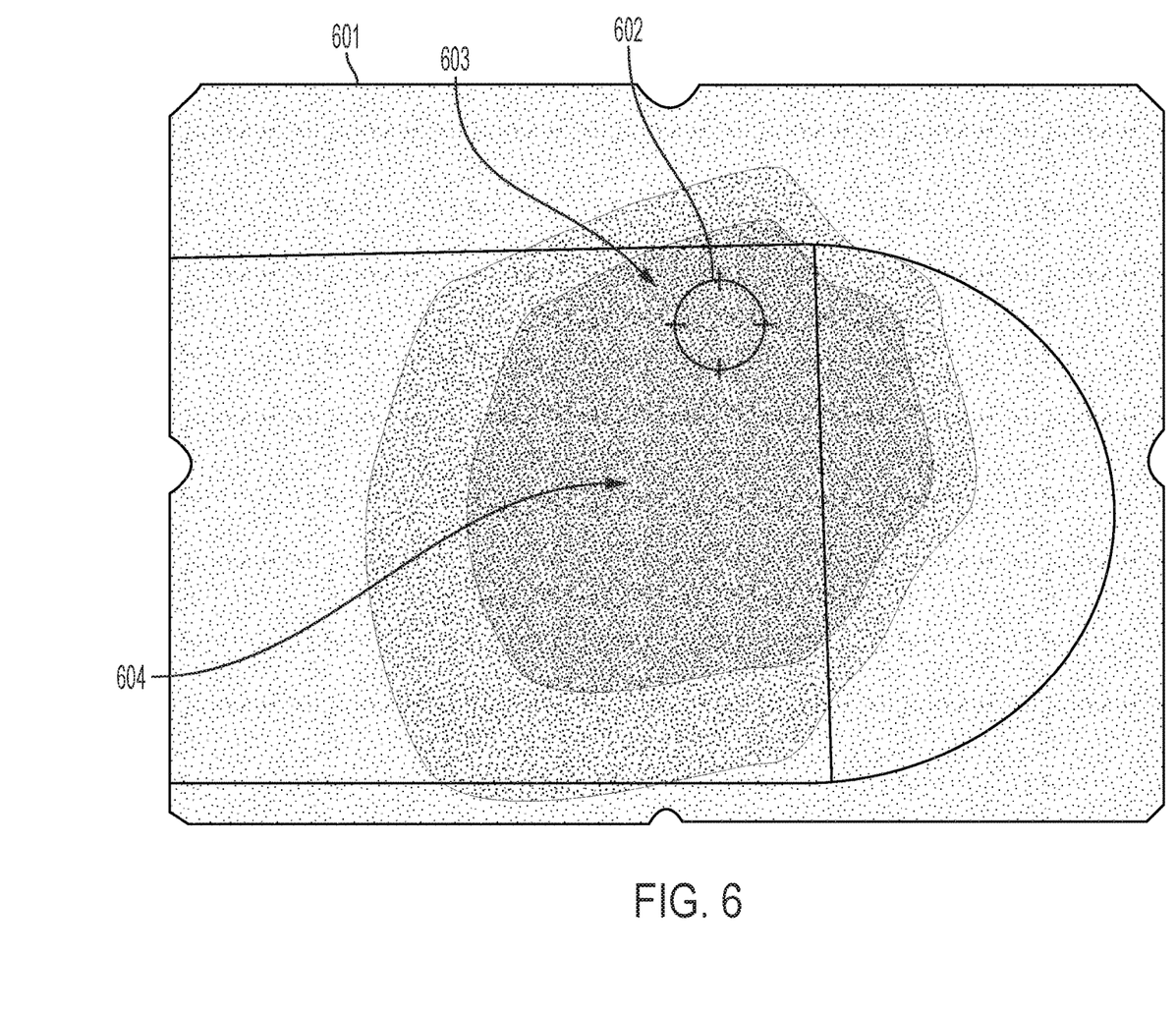
FIG. 6 is an example image of a segment of an illuminated surface, showing how light may be detected at difference luminance values in different areas of the image.

In FIG. 6, the system may also detect a second area of maximum luminance 604 in the segment. If multiple areas are detected, the system may determine whether the segment is associated with multiple light fixtures, each of which has a corresponding expected location of maximum luminance in the segment. If so, then the system may use the process above to check alignment of two or more lighting devices using a single image.

Figure 7A:
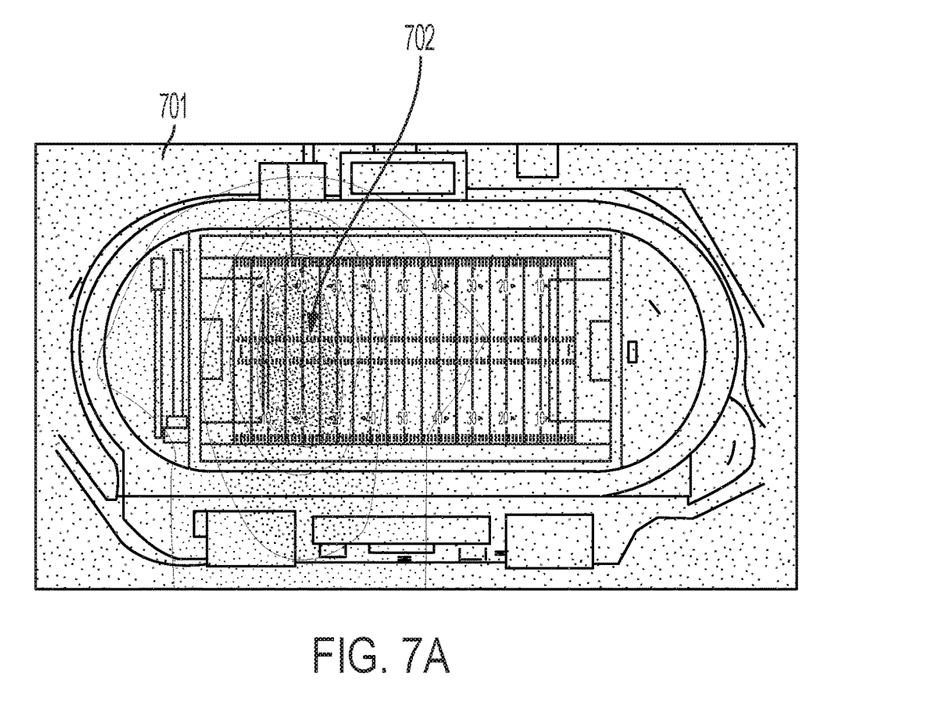
FIG. 7A illustrates an image in which light directed by a light fixture to a segment of the illuminated surface has an expected beam shape and may be considered to be properly aligned.
Figure 7B:
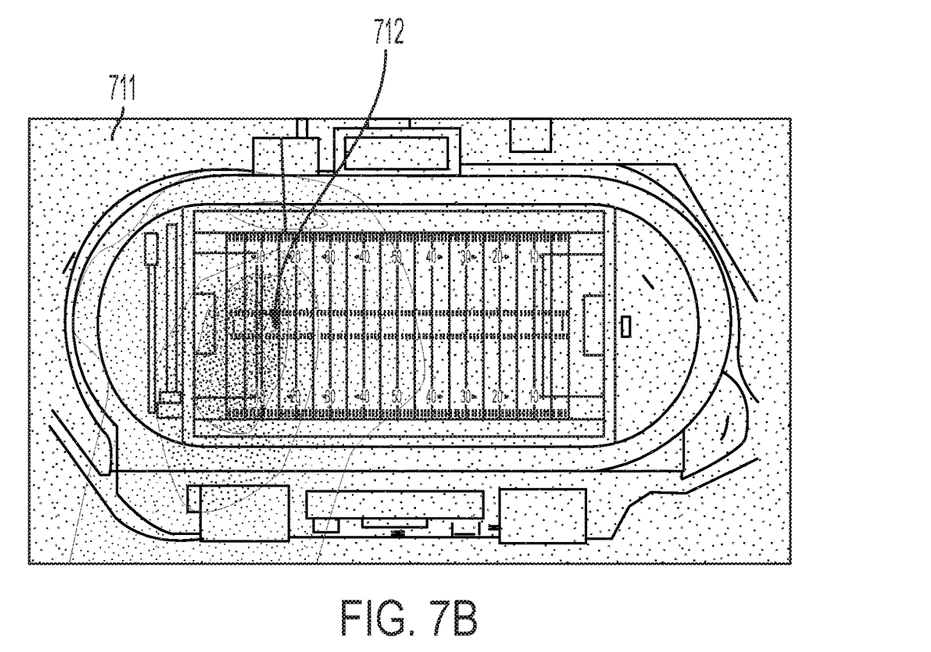
FIG. 7B is an image in which light directed by a light fixture to a segment of the illuminated surface does not have an expected beam shape and thus may be considered to be improperly aligned.

The system also may analyze the shape of the area of maximum luminance to determine whether the light device is misaligned. For example, referring to FIG. 7A a first image of a segment of a surface 701 shows a light beam in which the area of maximum luminance 702 corresponds to its expected (i.e., specified) location for a scene. In this example, the area is an oval shape that is centered approximately along the 18-yard line of the field, from one sideline to the other. In FIG. 7B, the image of the segment of the surface 711 shows that the area of maximum luminance 712 is losing its oval shape, and its central axis is angled from the 10 yard line on one sideline toward the end zone. Thus, the image of FIG. 7A shows that its light fixture is correctly aligned while the light fixture of FIG. 7B is misaligned.

Returning to FIG. 4, if the system does not determine that the light fixture is improperly aligned (step 411), it may determine that no further action is required relating to that light fixture unless the analysis of subsequent images indicate that the light fixture is not property aligned (step 412). For any image that contains content indicating that the light fixture that is configured to direct light to the segment contained in the image is not properly aligned (step 413), the gateway controller may generate and output/transmit a signal indicating that that light fixture requires recalibration (step 414).

If the light fixture requires recalibration, the gateway controller also may generate and send a command (step 415), or the calibration signal may include a command, to the fixture controller of the light fixture to adjust a shape or direction of light emitted by the light fixture. Alternatively or in addition, if the light fixture is equipped with a motor that can adjust the position of the light fixture, the command generated in step 415 may include roll, pitch and/or yaw adjustment values to a motor controller to command the motor to reposition the light fixture to an adjusted position so that the fixture's light beam will be directed to the expected location.

For embodiments where the signal is to adjust a shape or direction of light emitted by the light fixture, the disclosure of U.S. Patent Application Publication Number 2018/0038581, titled "Lighting Device LED Module with Effects for Beam Spread Tuning and Beam Shaping," is fully incorporated into this document by reference and discloses how such commands may be generated. The light distribution of a floodlight is generally known as the "beam spread." In embodiments where the light fixture is an LED light fixture containing one or more LED modules, the light fixture may include module-level conductors that can selectively deliver current to any of various LED sets in each LED module. The LED sets may be selectively arranged to yield a particular beam shape or size, such as in concentric rings. The shape and size of each section of the LED set will exhibit a particular beam spread of light. LEDs in an LED set also may be positioned to form quadrants so that when selectively activated, the LEDs of each section provide light in a desired direction. Thus, the commands may be to selectively activate and/or deactivate various sections of an LED set to achieve a desired output beam spread and/or direction.

Figure 8:
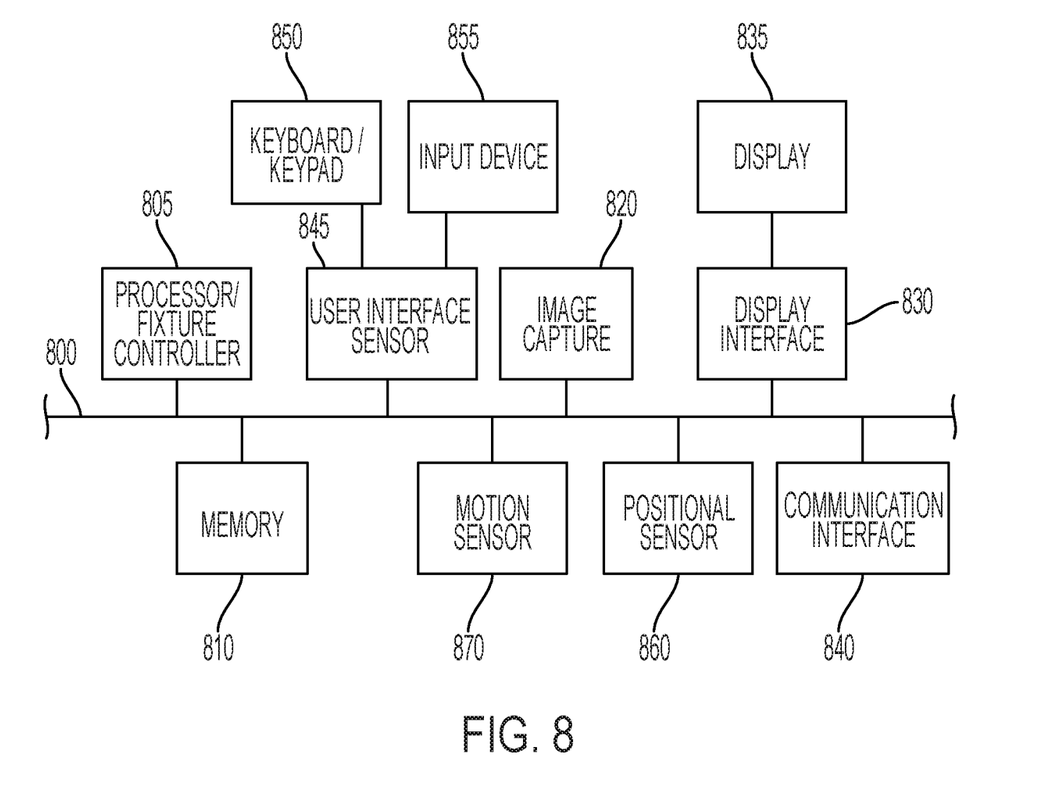
FIG. 8 illustrates various hardware components that may be included in one or more electronic devices.

FIG. 8 is a block diagram of hardware that may be including in any of the electronic devices described above, such as a lighting device, drone or controller device. A bus 800 serves as an information highway interconnecting the other illustrated components of the hardware. The bus may be a physical connection between elements of the system, or a wired or wireless communication system via which various elements of the system share data. Processor 805 is a processing device of the system performing calculations and logic operations required to execute a program. Processor 805, alone or in conjunction with one or more of the other elements disclosed in FIG. 8, is an example of a processing device, computing device or processor as such terms are used within this disclosure. The processing device may be a physical processing device, a virtual device contained within another processing device, or a container included within a processing device. If the electronic device is a lighting device, processor 805 may be a component of a fixture controller if the electronic device is a lighting device, and the device would also include a power supply and optical radiation source as discussed above.

A memory device 810 is a hardware element or segment of a hardware element on which programming instructions, data, or both may be stored. An optional display interface 830 may permit information to be displayed on the display 835 in audio, visual, graphic or alphanumeric format. Communication with external devices, such as a printing device, may occur using various communication interfaces 840, such as a communication port, antenna, or near-field or short-range transceiver. A communication interface 840 may be communicatively connected to a communication network, such as the Internet or an intranet.

The hardware may also include a user input interface 845 which allows for receipt of data from input devices such as a keyboard or keypad 850, or other input device 855 such as a mouse, a touchpad, a touch screen, a remote control, a pointing device, a video input device and/or a microphone. Data also may be received from an image capturing device 820 such as a digital camera or video camera. A positional sensor 860 and/or motion sensor 870 may be included to detect position and movement of the device. Examples of motion sensors 870 include gyroscopes or accelerometers. Examples of positional sensors 860 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for detecting misalignment of a light fixture in a set of light fixtures that direct light to a surface, the system comprising:
   a gateway controller device; and
   an aerial drone that is equipped with an imaging device; and
   a computer-readable memory device containing programming instructions that are configured to cause the gateway controller device to:
      receive, via a communication interface from the aerial drone, images captured by the imaging device at one or more locations over an illuminated surface,
      select a group of the images and, for each image in the group:
         identify a segment of the illuminated surface that is contained in the image,
         identify a light fixture that is configured to direct light to the segment, and
         determine whether the image contains content indicating that the light fixture that is configured to direct light to the segment is improperly aligned; and
      for any image that contains content indicating that the light fixture that is configured to direct light to the segment contained in the image is improperly aligned, output a signal indicating that that light fixture requires recalibration.

2. The system of claim 1, wherein the programming instructions to determine, for each image in the group, whether the image contains content indicating that the light fixture that is configured to direct light to the segment is improperly aligned comprise instructions to:
   measure luminance of each pixel in a group of pixels in the image;
   detect a position of maximum luminance in the segment;
   access a data set of calibration data and identify, from the data set, an expected location of maximum luminance for the segment;
   determine whether the detected position of maximum luminance is within a tolerance range of the expected location; and
   if the detected position of maximum luminance is within the tolerance range of the expected location determine that the light fixture is properly aligned, otherwise determine that the light fixture is improperly aligned.

3. The system of claim 1, wherein the programming instructions to determine, for each image in the group, whether the image contains content indicating that the light fixture that is configured to direct light to the segment is improperly aligned comprise instructions to:
   measure luminance of each pixel in a group of pixels in the image;
   detect an area of maximum luminance in the segment;
   identify a size of the area of maximum luminance;
   access a data set of calibration data and identify, from the data set, an expected size for the area of maximum luminance for the segment;
   determine whether the detected size of the area of maximum luminance matches the expected size; and
   if the detected size matches the expected size determine that the light fixture is properly aligned, otherwise determine that the light fixture is improperly aligned.

4. The system of claim 1, wherein the programming instructions to determine, for each image in the group, whether the image contains content indicating that the light fixture that is configured to direct light to the segment is improperly aligned comprise instructions to:
   measure luminance of each pixel in a group of pixels in the image;
   detect an area of maximum luminance in the segment;
   identify a shape of the area of maximum luminance;
   access a data set of calibration data and identify, from the data set, an expected shape for the area of maximum luminance for the segment;
   determine whether the detected shape of the area of maximum luminance matches the expected shape; and
   if the detected shape matches the expected shape determine that the light fixture is properly aligned, otherwise determine that the light fixture is improperly aligned.

5. The system of claim 1, further comprising:
   a drone controller; and
   a computer-readable memory containing programming instructions configured to cause the drone controller cause the aerial drone to capture the images by:
      causing the aerial drone to move within an imaging range of each of a plurality of reference points in the facility, and
      for each of the reference points, capturing an image of an area of the illuminated surface that includes the reference point.

6. The system of claim 1, wherein the programming instructions are also configured to cause the gateway controller device to, for each image in the group:
   identify a beam shape of emitted light directed to the segment by detecting a shape of a group of adjacent pixels in the image for which the measured luminance is at least a threshold percentage of the maximum luminance; and use the identified beam shape when identifying the segment of the surface that is contained in the image by selecting, from a data set, a segment of the surface having an expected beam shape that corresponds to the identified beam shape.

7. The system of claim 1 further comprising:

the light fixture, which is associated with a fixture controller; and additional programming instructions that are configured to cause the gateway controller device to, upon determining that the light fixture is not properly aligned, send a command to the fixture controller of the light fixture to adjust a shape or direction of light emitted by the light fixture.

8. The system of claim 1 further comprising:

the light fixture;

a motor and a motor controller configured to move the light fixture; and additional programming instructions that are configured to cause the gateway controller device to, upon determining that the light fixture is not properly aligned, send a command to the motor controller of the light fixture to adjust roll, pitch and/or yaw of the light fixture.

9. A method of detecting misalignment of a light fixture in a set of light fixtures that direct light to a surface, the method comprising, by a gateway controller device:

receiving, via a communication interface, images captured by an aerial drone at one or more locations over an illuminated surface;

selecting a group of the images and, for each image in the group:

identifying a segment of the illuminated surface that is contained in the image, identifying a light fixture that is configured to direct light to the segment, and determining whether the image contains content indicating that the light fixture that is configured to direct light to the segment is improperly aligned; and for any image that contains content indicating that the light fixture that is configured to direct light to the segment contained in the image is improperly aligned, outputting a signal indicating that that light fixture requires recalibration.

10. The method of claim 9, wherein the determining, for each image in the group, whether the image contains content indicating that the light fixture that is configured to direct light to the segment is improperly aligned comprises:

measuring luminance of each pixel in a group of pixels in the image;

detecting a position of maximum luminance in the segment;

accessing a data set of calibration data and identifying, from the data set, an expected location of maximum luminance for the segment;

determining whether the detected position of maximum luminance is within a tolerance range of the expected location; and if the detected position of maximum luminance is within the tolerance range of the expected location determining that the light fixture is properly aligned, otherwise determining that the light fixture is improperly aligned.

11. The method of claim 9, wherein the determining, for each image in the group, whether the image contains content indicating that the light fixture that is configured to direct light to the segment is improperly aligned comprises:

measuring luminance of each pixel in a group of pixels in the image;

detecting an area of maximum luminance in the segment;

identifying a size of the area of maximum luminance;

accessing a data set of calibration data and identifying, from the data set, an expected size for the area of maximum luminance for the segment;

determining whether the detected size of the area of maximum luminance matches the expected size; and if the detected size matches the expected size determining that the light fixture is properly aligned, otherwise determining that the light fixture is improperly aligned.

12. The method of claim 9, wherein the determining, for each image in the group, whether the image contains content indicating that the light fixture that is configured to direct light to the segment is improperly aligned comprises:

measuring luminance of each pixel in a group of pixels in the image;

detecting an area of maximum luminance in the segment;

identifying a shape of the area of maximum luminance;

accessing a data set of calibration data and identify, from the data set, an expected shape for the area of maximum luminance for the segment;

determining whether the detected shape of the area of maximum luminance matches the expected shape; and if the detected shape matches the expected shape determining that the light fixture is properly aligned, otherwise determining that the light fixture is improperly aligned.

13. The method of claim 9 further comprising, by a drone controller, causing the aerial drone to capture the images by:

causing the aerial drone to move within an imaging range of each of a plurality of reference points in the facility; and for each of the reference points, causing an imaging device of the aerial drone to capture an image of an area of the illuminated surface that includes the reference point.

14. The method of claim 9 further comprising, by the gateway controller device, for each image in the group:

identifying a beam shape of emitted light directed to the segment by detecting a shape of a group of adjacent pixels in the image for which the measured luminance is at least a threshold percentage of the maximum luminance; and using the identified beam shape when identifying the segment of the surface that is contained in the image by selecting, from a data set, a segment of the surface having an expected beam shape that corresponds to the identified beam shape.

15. The method of claim 9 further comprising by the gateway controller:

determining that a light fixture is not properly aligned; and sending a command to a fixture controller of the light fixture to adjust a shape or direction of light emitted by the light fixture.

16. The method of claim 9 further comprising:

determining that a light fixture is not properly aligned; and sending a command to a motor controller of the light fixture to adjust roll, pitch and/or yaw of the light fixture.

17. A system for detecting misalignment of a light fixture, the system comprising:

a gateway controller device; and a computer-readable memory device containing programming instructions that are configured to cause the gateway controller device to:
- receive an image captured by an imaging device at a location over an illuminated surface,
- identify a segment of the illuminated surface that is contained in the image,
- identify a light fixture that is configured to direct light to the segment,
- determine whether the image contains content indicating that the light fixture that is configured to direct light to the segment is improperly aligned, and
- if the image contains content indicating that the light fixture is improperly aligned, output a signal indicating that that light fixture requires recalibration.

18. The system of claim 1, wherein the programming instructions to determine whether the image contains content indicating that the light fixture that is configured to direct light to the segment is improperly aligned comprise instructions to:
- measure luminance of each pixel in a group of pixels in the image;
- detect an area of maximum luminance in the segment;
- identify one or more of the following: a position, size, or shape of the area of maximum luminance;
- access a data set of calibration data and identify, from the data set, an expected position, size and/or shape for the area of maximum luminance for the segment;
- determine whether the detected position, size, and/or shape of the area of maximum luminance matches the expected position, size, and/or shape; and
- if the detected position, size, and/or shape matches the expected position, size, and/or shape determine that the light fixture is properly aligned, otherwise determine that the light fixture is improperly aligned.

19. The system of claim 17 further comprising:
the light fixture, which is associated with a fixture controller; and
additional programming instructions that are configured to cause the gateway controller device to, upon determining that the light fixture is not properly aligned, send a command to the fixture controller of the light fixture to adjust a shape or direction of light emitted by the light fixture.

20. The system of claim 17 further comprising:
the light fixture;
a motor and motor controller configured to move the light fixture; and
additional programming instructions that are configured to cause the gateway controller device to, upon determining that the light fixture is not properly aligned, send a command to the motor controller of the light fixture to adjust roll, pitch and/or yaw of the light fixture.

* * * * *